April 7, 1970  MASAMI INADA  3,504,948
SAFETY BRAKE SYSTEM FOR A MOTOR VEHICLE
Filed July 31, 1967
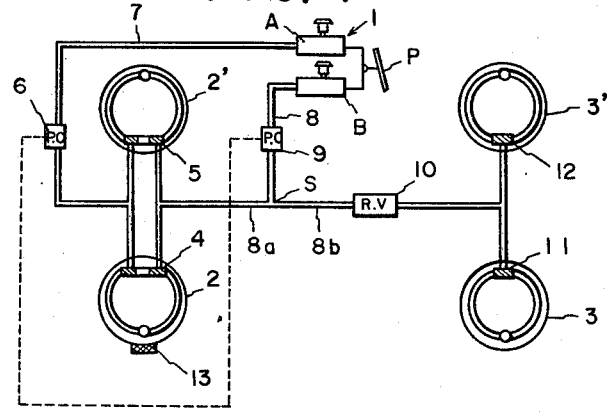
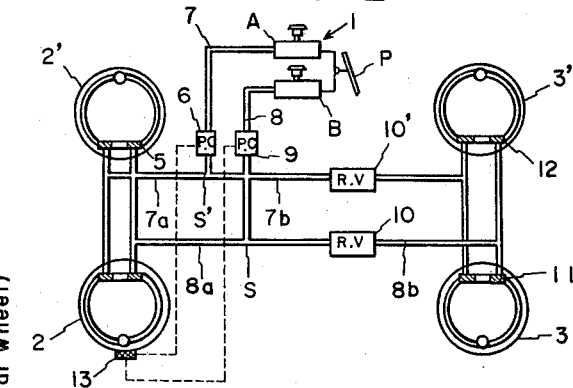
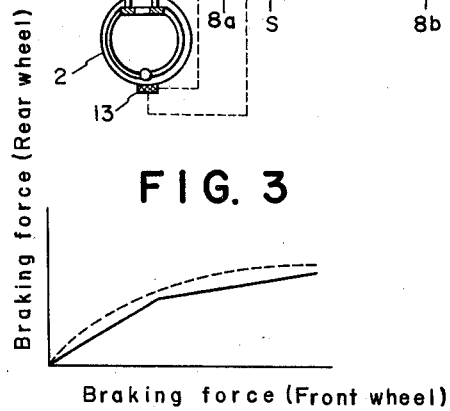
Masami Inada,
INVENTOR.
BY Wendroth, Lind
And Ponack, Attys 3,504,948
SAFETY BRAKE SYSTEM FOR A
MOTOR VEHICLE
Masami Inada, Kariya, Japan, assignor to Aisin Seiki
Kabushiki Kaisha, Kariya, Aichi Prefecture, Japan
Filed July 31, 1967, Ser. No. 657,200
Claims priority, application Japan, Aug. 6, 1966,
41/51,768
Int. Cl. B60t 8/12
U.S. Cl. 303—21        5 Claims

ABSTRACT OF THE DISCLOSURE

This invention relates to a safety brake system for a motor vehicle including two brake fluid circuits, in which there is provided a reducing valve in the brake fluid conduit in front of the rear wheel brake cylinders, and so designed that normally the locking of the front wheels precedently occurs, thereby it is made possible to obtain safety braking by preventing objectionable spin and unstable steering of the vehicle which would have occurred when the rear wheels are precedently locked.

---

An object of the present invention is to provide a brake system of the above character which is reliable in operation and is inexpensive of manufacture. Other objects of this invention will become apparent from the following detailed description taken in conjunction with the accompanying drawings wherein:

FIGURE 1 shows diagrammatically a brake system according to the present invention;

FIGURE 2 is a similar view showing a modified form of the brake system of this invention; and FIGURE 3 is a diagram showing the relative graph of rear wheel braking force curve and the front wheel braking force curve. With respect to FIGURES 1 and 2, the similar reference numerals designate similar or equivalent parts.

Referring to FIG. 1, 1 is a tandem master cylinder consisting of two cylinders A and B to be actuated by a brake pedal P. 2 is a left-hand front wheel; 2' a right-hand front wheel; 3 a left-hand rear wheel, and 3' is a right-hand rear wheel. The wheel cylinders 4 and 5 of the front wheels 2 and 2' are each partitioned into two oil chambers, and each half of said oil chambers 4 and 5 is connected to the master cylinder A by a conduit 7, in which a brake pressure control device 6 is provided. A conduit 8 from the master cylinder B is provided with a brake pressure control device 9, and this conduit 8 is branched at S into two conduits 8a and 8b. One conduit 8a is branched and connected to remaining half of each of said oil chambers of said wheel cylinders 4 and 5, respectively, as shown. The other conduit 8b is provided with a reducing valve 10 and is branched to be connected to the rear wheel cylinders 11 and 12. The left-hand front wheel 2 is provided with a skid detector 13 adapted to detect skidding of said front wheels 2, 2' and for preventing the skidding by actuating said brake pressure control devices 6 and 9.

When the brake fluid pressure in the master cylinders A and B is increased upon stepping down of the brake pedal P, the brake pressure from the master cylinder A is introduced into one half each of the front wheel cylinders 4 and 5 through the brake pressure control device 6, increasing thereby the pressure in said half cylinder chambers. At the same time, brake fluid from the master cylinder B fed through the pressure control device 9 is branched at S into the conduits 8a and 8b. Brake fluid from the conduit 8a is further branched and introduced into the remaining halves of the front wheel cylinder chambers 4 and 5. On the other hand, brake fluid from the conduit 8b, passing through the reducing valve 10, is branched and introduced into the rear wheel cylinders 11 and 12. Since the braking pressure for the rear wheels 3 and 3' is reduced at the reducing valve 10, the final braking force acting on the rear wheels will be reduced to less than the braking force applied to the front wheels 2 and 2'. As a result, normally the locking of the front wheels precedently occurs, so that safety braking may be attained. With such precedent locking of the front wheels 2 and 2', as shown in FIG. 3, the actual braking force distribution curve shown in solid line will be lower than the ideal braking force distribution curve shown in dotted line, so that any dangerous spin and unstable steering of the vehicle may be prevented. At the time of emergency braking or at the braking on a muddy or snowy road, upon skidding or nearly skidding of the wheels, since the brake is always applied precedently to the front wheels, the skid detector 13 detects the skidding, and the brake pressure control devices 6 and 9 in the brake fluid conduits from the master cylinders A and B are put into operation to automatically reduce the brake pressure and, as soon as the wheels return to their normal condition, the braking pressure will be increased so as to apply effective brake without any fear of causing resulting skidding of the wheels.

In the modified form of the braking system of this invention shown in FIG. 2, the conduit 7 from the master cylinder A is provided with a brake pressure control device 6 and is branched at S' into conduits 7a and 7b. The conduit 7a is further branched and connected to each half of the partitioned chambers of the front wheel cylinders 4 and 5, whereas the conduit 7b is provided with a reducing valve 10' and connected to each half of the partitioned chambers of the rear wheel cylinders 11 and 12 of the rear wheels 3 and 3', respectively. Similarly, the conduit 8 leading from the cylinder B is provided with a braking pressure control device 9 and is branched at S into conduits 8a and 8b. The conduit 8a is branched and connected to other half of each partitioned chamber of the front wheel cylinders 4 and 5. Another conduit 8b is provided with a reducing valve 10 and is connected to other half of each partitioned chambers of the rear wheel cylinders 11 and 12. 13 is the skid detector similar to that shown in FIG. 1, and is operatively connected to the brake pressure control devices 6 and 9.

It will be seen that the modified form of the embodiment of this invention shown in FIG. 2 is somewhat different from that shown in FIG. 1, but that the manner of operation is substantially same, with the exception that in FIG. 2 embodiment some additional advantage may be expected. Namely, the branched conduits 7b from the master cylinder A as well as the branched conduits 8b from the master cylinder B are connected to the rear wheel cylinders 11 and 12 through the reducing valves 10' and 10 respectively, so that even where there might occur a failure in the conduit from one of the master cylinders A and B (for instance, in the conduit 8 leading from the master cylinder B), required safety braking effect may yet be maintained. In such case, locking of the front wheels 2 and 2' will precedently occur.

From the foregoing, according to the braking system of the present invention, it will be seen that by the provision of the reducing valve in the braking fluid circuit for the rear wheels it is possible to obtain precedent blocking of the front wheels, thereby enabling to always obtain safety braking effect, and also that dangerous spin or unstable steering of the vehicle due to skidding may be avoided by the provision of a front wheel skid detector adapted to put the brake pressure control devices into operation.

What I claim is:

1. A brake system for a multiple wheeled motor vehicle having front and rear wheels comprising fluid pressure operated dual master cylinder means including a first and a second master cylinder; said first cylinder (A) having an outlet in communication with front wheel cylinders (4 and 5); said second cylinder (B) having an outlet in communication with rear wheel cylinders (11 and 12), a first fluid conduit (7) connecting said first-mentioned outlet with the front wheel cylinders (4 and 5); a first pressure control device (6) provided in said first conduit; a second fluid conduit (8) connecting said outlet of said second cylinder (B) with said rear wheel cylinders; a second pressure control device (9) in said second conduit; a reducing valve (10) provided in said second conduit (8) between said second pressure control device (9) and said rear wheel cylinders (11 and 12); said front wheel cylinders (4 and 5), and said rear wheel cylinders (11 and 12) are, respectively, provided with fluid pressure control receiving inlets at opposite ends thereof, and wherein said first conduit (7) is connected with one end of each of said front wheel cylinders (4 and 5) beyond said first pressure control device (6); a third fluid conduit (8b) connecting the outlet of said second pressure control device (9) with one end of each of said rear wheel cylinders (11 and 12), said reducing valve (10) being provided in said third conduit (8b), a fourth conduit (7b) connecting the outlet of said second pressure control device (9) with the other end of each of said rear wheel cylinders (11 and 12), and further there is a second reducing valve (10') in said fourth conduit (7b) provided between said second pressure controlling device (9) and the other ends of said rear wheel cylinders (11 and 12), and a skid detector means (13) provided in one of the front wheels and associated with said first and second pressure control devices; the parts being so arranged that when angular deceleration of the front wheels exceeds a predetermined degree said first and second pressure control devices (6 and 9) serve to shut off the communication of the braking fluid pressure between said dual master cylinders (A and B) and the front and rear wheel cylinders, respectively, and further serves to increase the volume of the wheel cylinders.

2. A brake system as defined in claim 1 wherein said fourth conduit is branched between said second pressure controlling device (9) and said second reducing valve (10') and thereby connecting the outlet of said second pressure control device with the other end of said front wheel cylinders (4 and 5).

3. A brake system for a multiple wheeled motor vehicle having front and rear wheels, comprising fluid pressure operated dual master cylinder means including a first and a second master cylinder; said first cylinder (A) having an outlet in communication with front wheel cylinders (4 and 5); said second cylinder (B) having an outlet in communication with rear wheel cylinders (11 and 12); a first fluid conduit (7) connecting said first-mentioned outlet with the front cylinders (4 and 5); a first pressure control device (6) provided in said first conduit; a second fluid conduit (8) connecting said outlet of said second cylinder (B) with said rear wheel cylinders; a second pressure control device (9) in said second conduit, a reducing valve (10) provided in said second conduit (8) between said second pressure control device (9) and said rear wheel cylinders (11 and 12); said rear wheel cylinders being provided with fluid pressure control receiving inlets at opposite ends thereof; a third fluid conduit (8b) connecting the outlet of said second pressure control device (9) with one end of said rear wheel cylinders (11 and 12); said reducing valve (10) being provided in said third conduit (8b); and a skid detector means (13) provided in one of the front wheels and associated with said first and second pressure control devices; the parts being so arranged that when angular deceleration of the front wheels exceeds a predetermined degree said first and second pressure control devices (6 and 9) serve to shut off the communication of the braking fluid pressure between said dual master cylinders (A and B) and the front and rear wheel cylinders, respectively, and further serves to increase the volume of the wheel cylinders.

4. A brake system for a motor vehicle as recited in claim 3, wherein there is further provided a fourth conduit (7b) connecting the outlet of said second pressure control device (9) with the other end of each of said rear wheel cylinders (11 and 12); and further there is a second reducing valve (10') in said fourth conduit (7b) provided between said second pressure controlling device (9) and the other ends of said rear wheel cylinders (11 and 12).

5. A brake system for a multiple wheeled motor vehicle having front and rear wheels, comprising fluid pressure operated dual master cylinder means including a first and a second master cylinder; said first cylinder (A) having an outlet in communication with front wheel cylinders (4 and 5); said second cylinder (B) having an outlet in communication with rear wheel cylinders (11 and 12); a first fluid conduit (7) connecting said first-mentioned outlet with the front wheel cylinders (4 and 5); a first pressure control device (6) provided in said first conduit; a second fluid conduit (8) connecting said outlet of said second cylinder (B) with said rear wheel cylinders; a second pressure control device (9) in said second conduit, a reducing valve (10) provided in said second conduit (8) between said second pressure control device (9) and said rear wheel cylinders (11 and 12); said front wheel cylinders 4 and 5), and said rear wheel cylinders (11 and 12) are, respectively, provided with fluid pressure control receiving inlets at opposite ends thereof, with said first conduit (7) being connected with one end of each of said front wheel cylinders (4 and 5) beyond said first pressure control device (6); a third fluid conduit (8b) connecting the outlet of said second pressure control device (9) with one end of each of said rear wheel cylinders (11 and 12), said reducing valve (10) being provided in said third conduit (8b); and a skid detector means (13) provided in one of the front wheels and associated with said first and second pressure control devices; the parts being so arranged that when angular deceleration of the front wheels exceeds a predetermined degree said first and second pressure control devices (6 and 9) serve to shut off the communication of the braking fluid pressure between said dual master cylinders (A and B) and the front and rear wheel cylinders, respectively, and further serves to increase the volume of the wheel cylinders.

References Cited

UNITED STATES PATENTS

| 1,714,911 | 5/1929 | Jones et al. | 188—181 |
| 2,835,271 | 5/1958 | Oberthur | 188—152 X |
| 2,868,338 | 1/1959 | Lucien et al. | 188—181 |
| 2,918,148 | 12/1959 | Uhlenhaut et al. | 188—152 |
| 3,368,350 | 2/1968 | Cripe | 303—6 X |

DUANE A. REGER, Primary Examiner

U.S. Cl. X.R.

188—181; 303—6